US 8,260,048 B2
Sep. 4, 2012

(12) United States Patent
Jin

(10) Patent No.: US 8,260,048 B2
(45) Date of Patent: Sep. 4, 2012

(54) SEGMENTATION-BASED IMAGE PROCESSING SYSTEM

(75) Inventor: Xiaoying Jin, Boulder, CO (US)

(73) Assignee: Exelis Inc., McLean, VA (US)

( * ) Notice: Subject to any disclaimer, the term of this patent is extended or adjusted under 35 U.S.C. 154(b) by 1296 days.

(21) Appl. No.: 11/984,222

(22) Filed: Nov. 14, 2007

(65) Prior Publication Data

US 2009/0123070 A1  May 14, 2009

(51) Int. Cl.
*G06K 9/34* (2006.01)
*G06K 9/00* (2006.01)
*G06K 9/46* (2006.01)
*G06K 9/66* (2006.01)
*G06K 9/36* (2006.01)

(52) U.S. Cl. ......... 382/173; 382/128; 382/190; 382/276

(58) Field of Classification Search .......... 382/128, 382/173, 190, 276
See application file for complete search history.

(56) References Cited

U.S. PATENT DOCUMENTS

| | | | |
|---|---|---|---|
| 5,787,194 A | 7/1998 | Yair | |
| 5,903,664 A | 5/1999 | Hartley et al. | |
| 5,984,870 A | 11/1999 | Giger et al. | |
| 6,832,002 B2 | 12/2004 | Baatz et al. | |
| 6,895,115 B2 | 5/2005 | Tilton | |
| 2002/0136454 A1* | 9/2002 | Park et al. | 382/168 |
| 2002/0154798 A1 | 10/2002 | Cong et al. | |
| 2003/0068074 A1 | 4/2003 | Hahn | |
| 2004/0234156 A1* | 11/2004 | Watanabe et al. | 382/254 |
| 2004/0258305 A1 | 12/2004 | Burnham et al. | |
| 2004/0267530 A1* | 12/2004 | He et al. | 704/256 |
| 2005/0271280 A1* | 12/2005 | Farmer et al. | 382/224 |
| 2006/0013481 A1* | 1/2006 | Park et al. | 382/170 |
| 2006/0269141 A1* | 11/2006 | Takahashi | 382/199 |
| 2007/0219769 A1* | 9/2007 | Herzog et al. | 703/11 |
| 2008/0317322 A1* | 12/2008 | Acharyya et al. | 382/132 |

OTHER PUBLICATIONS

Ng, H.—"Medical image segmentation using K-means clustering and improved watershed algorithm"—IEEE—Jun. 2006, pp. 61-65.*
Wolfram—"Edge Detection"—Wolfram Research—Mathematica—captured by the WayBackMachine Internet Archive on Nov. 9, 2006, pp. 1-6.*
Scheunders, P.—"Multiscale watershed segmentation of multivalued images"—IEEE 2002, pp. 855-858.*
Noyel, G.—"Morphological segmentation of hyperspectral images"—Image Analysis and Stereology—Nov. 1, 2007, pp. 101-109.*
Benediktsson, J.—"Classification of hyperspectral data from urban areas based on extended morphological profiles"—IEEE 2005, pp. 480-491.*
International Search Report and Written Opinion mailed Jan. 7, 2009 in PCT/US08/83612.
International Preliminary Report on Patentability in PCT Appln. No. PCT/US2008/083612, dated May 18, 2010 [6 pages].

(Continued)

*Primary Examiner* — Bernard Krasnic
(74) *Attorney, Agent, or Firm* — Davidson Berquist Jackson & Gowdey LLP

(57) ABSTRACT

A digital image can be processed by an image processing method that calculates a gradient map for the digital image, calculates a density function for the gradient map, calculates a modified gradient map using the gradient map, the density function and the selected scale level, and segments the modified gradient map. Prior to segmenting the modified gradient map, a sub-image of the digital image can be segmented at the selected scale level to determine if the selected scale level will give the desired segmentation.

26 Claims, 11 Drawing Sheets
(2 of 11 Drawing Sheet(s) Filed in Color)

OTHER PUBLICATIONS

D. J. Robinson, N. J. Redding and D. J Crisp, "Implementation of a fast algorithm for segmenting SAR imagery," Scientific and Technical Report, Defense Science and Technology Organization, Australia, Jan. 2002.

J. M. Gauch, "Image segmentation and analysis via multiscale gradient watershed hierarchies," IEEE Trans. Image Processing, vol. 8, No. 1, pp. 69-79, 1999.

Jain et al., Data Clustering: A Review, ACM Computing Surveys, vol. 31, No. 3, Sep. 1999, pp. 264-323.

K. Haris, et al., "Hybrid image segmentation using watershed and fast region merging," IEEE Trans. Image Processing, vol. 7, No. 12, pp. 1684-1699, 1998.

K. S. Fu and J. K. Mui, "A survey on image segmentation," Pattern Recognition, vol. 13, No. 1, pp. 3-16, 1981.

L. Shafarenko, M. Petrou and M. Kittler, "Automatic watershed segmentation of randomly textured color images," IEEE Trans. Image Processing, vol. 6, No. 11, pp. 1530-1544, 1997.

L. Vincent and P. Soille, "Watershed in digital spaces: an efficient algorithm based on immersion simulations," IEEE Trans. Pattern Analysis and Machine Intelligence, vol. 13, No. 6, pp. 583-598, 1991.

P. K. Sahoo, S. Soltani and A. K. C. Wong, "A survey of thresholding techniques," Computer Vision, Graphics, and Image Processing, vol. 41, pp. 233-260, 1988.

P. T. Jackway, "Gradient watersheds in morphological scale-space," IEEE Trans. Image Processing, vol. 5, No. 6, pp. 913-921, 1996.

R. M. Haralick and L. G. Shapiro, "Survey: image segmentation techniques," Computer Vision, Graphics, and Image Processing, vol. 29, No. 1, pp. 100-132, 1985.

R. Nevatia and K. R. Babu, "Linear feature extraction and description," Computer Graphics and Image Processing, vol. 13, pp. 257-269, 1980.

X. Jin and C. H. Davis, "A genetic image segmentation algorithm with a fuzzy-based evaluation function," in Proc. IEEE International Conference on Fuzzy Systems, pp. 938-943, St. Louis, MO, May 25-28, 2003.

* cited by examiner

400

| 1 | 2 | 3 | ... | ... | n |
|---|---|---|---|---|---|
| n+1 | n+2 | n+3 | | | 2n |
| | | | | | |
| | | | | | |
| | | | | | |
| | | | | | n*m |

Fig. 6

| 1 | 2 | 4 | 7. | ... | |
|---|---|---|---|---|---|
| 3 | 5 | 8 | ... | | |
| 6 | 9 | ... | | | |
| 10 | | | | | |
| | | | | | |
| | | | | | n*m |

Fig. 7

SEGMENTATION-BASED IMAGE PROCESSING SYSTEM

FIELD OF INVENTION

The present invention is directed to an image processing method and system that can perform improved segmentation on an image, and in one embodiment to a method and system that can perform segmentation with a segmentation preview.

DISCUSSION OF THE BACKGROUND

In image processing, segmentation is the partitioning of a digital image into multiple regions (set of pixels), according to a given criterion and is used in the area of automatic image recognition (e.g., the recognition of buildings or roads from satellite imagery), computer-guided diagnosis and surgery for medical imaging, general bottom-up image analysis for industrial applications, etc. After segmentation, each region is assigned a unique label. Each region consists of a group of connected pixels that have similar data values.

Known segmentation techniques are described in: (1) K. S. Fu and J. K. Mui, "A survey on image segmentation," Pattern Recognition, Vol. 13, No. 1, pp. 3-16, 1981; (2) R. M. Haralick and L. G. Shapiro, "Survey: image segmentation techniques," Computer Vision, Graphics, and Image Processing, Vol. 29, No. 1, pp. 100-132, 1985; (3) N. R. Pal and S. K. Pal, "A review on image segmentation techniques," Pattern Recognition, Vol. 26, No. 9, pp. 1277-1294, 1993; and (4) X. Jin and C. H. Davis, "A genetic image segmentation algorithm with a fuzzy-based evaluation function," in Proc. IEEE International Conference on Fuzzy Systems, pp. 938-943, St. Louis, Mo., May 25-28, 2003. The contents of those publications are incorporated herein by reference.

Most existing image segmentation algorithms can be roughly divided into the following three categories or their hybrids: (1) feature-space thresholding or clustering, (2) region growing or extraction, and (3) edge or gradient-based approaches.

P. K. Sahoo, S. Soltani and A. K. C. Wong, "A survey of thresholding techniques," Computer Vision, Graphics, and Image Processing, Vol. 41, pp. 233-260, 1988, incorporated herein by reference, presents a survey of the feature-space thresholding techniques. If there are clear separating modes in the histogram of the feature values, thresholding can effectively segment the image. U.S. Pat. No. 5,903,664 (incorporated herein by reference) describes using a thresholding technique to segment cardiac images. However, in uncontrolled image acquisition environments, such as remote sensing images, problems may be exhibited when only simple gray level thresholding is used.

A. K. Jain and P. J. Flynn, "Image segmentation using clustering," in Advances in Image Understanding, pp. 65-83, IEEE Computer Society Press, 1996 (incorporated herein by reference) describes a survey of the application of clustering methodology to the image segmentation problem. The modes in the histogram or the clusters in high-dimensional features are found by either supervised or unsupervised classification method. However, segmentation based on clustering may exhibit high computational complexity for many clustering algorithms and may incorrectly rely on strict assumptions (often multivariate Gaussian) about the multidimensional shape of clusters.

Region merging algorithms iteratively merge adjacent regions based on a certain merging cost criteria. Several region merging techniques are discussed in D. J. Robinson, N. J. Redding and D. J Crisp, "Implementation of a fast algorithm for segmenting SAR imagery," Scientific and Technical Report, Defense Science and Technology Organization, Australia, January 2002 (hereinafter Robinson), as well as in U.S. Pat. Nos. 5,787,194, 6,832,002 and 6,895,115 (all of which are incorporated herein by reference). Different algorithms differ in different merging criteria and controlling schemes of merging sequence. In Robinson, the implementation of a region growing algorithm (Full λ-schedule algorithm) was described as "the fastest possible implementation" and the computational complexity is of order $O(n \log_2 n)$, where n is the number of image pixels. Some known issues of region growing include: i) Segmentation results are sensitive to the merging sequence; ii) Termination criterion is usually some similarity measure threshold or number of iterations or output regions. It is very difficult to find the right value to get a satisfactory result; iii) High computation complexity if segmentation starts from individual pixels.

Another category of segmentation is based on edge detection and linking, as is described in R. Nevatia and K. R. Babu, "Linear feature extraction and description," Computer Graphics and Image Processing, Vol. 13, pp. 257-269, 1980. The technique is based on edge detection followed by linking broken edges. However, the edge linking process can have serious difficulties in producing connected, one-pixel wide contours.

Another paradigm for gradient-based segmentation is based on morphological watershed transform. The watershed segmentation works to detect catchment basins as regions and crest lines as boundaries for these regions. One such technique is described in L. Vincent and P. Soille, "Watershed in digital spaces: an efficient algorithm based on immersion simulations," IEEE Trans. Pattern Analysis and Machine Intelligence, Vol. 13, No. 6, pp. 583-598, 1991, which is incorporated herein by reference. One advantage of this algorithm is that object edges obtained by calculating gradient watershed boundaries are always guaranteed to be connected and closed, compared with edge detection and linking solutions.

Over-segmentation is a well-known problem of watershed segmentation. One way to solve the problem is to merge adjacent similar regions iteratively, as described in K. Haris, et al., "Hybrid image segmentation using watershed and fast region merging," IEEE Trans. Image Processing, Vol. 7, No. 12, pp. 1684-1699, 1998; and L. Shafarenko, M. Petrou and M. Kittler, "Automatic watershed segmentation of randomly textured color images," IEEE Trans. Image Processing, Vol. 6, No. 11, pp. 1530-1544, 1997, both of which are incorporated herein by reference. Just like the segmentation based on region merging and growing, it is very difficult to control the termination criteria of region merging step.

Another way to deal with over-segmentation is to build a watershed hierarchy using different scale spaces as described in P. T. Jackway, "Gradient watersheds in morphological scale-space," IEEE Trans. Image Processing, Vol. 5, No. 6, pp. 913-921, 1996 (hereinafter Jackway); and J. M. Gauch, "Image segmentation and analysis via multiscale gradient watershed hierarchies," IEEE Trans. Image Processing, Vol. 8, No. 1, pp. 69-79, 1999 (hereinafter Gauch), both of which are incorporated herein by reference.

Morphological scale space was used in Jackway, and Gaussian linear scale space was used in Gauch. Gaussian filtering or morphological operations with different scale parameters were applied to the original image. Since the original image was filtered to different degrees, the boundaries of segments would not meet at the edges in the original image. The paths of intensity extremes in the scale space must be followed as filtering of different levels proceeds. There are two relatively computationally complex steps involved in the above approaches: (i) building a scale space by applying Gaussian filtering or morphological operations with different scale parameters and (ii) linking intensity extremes from one scale level to the next (since the watershed lines move spatially with varying scale). Furthermore, the computational complexity worsens when the kernel increases quadratically with increasing scale parameters. Due to intensive computational overhead of the above existing approaches, the number of selected scale levels is usually limited to a small number.

Previous literature seldom goes through the segmentation for large images. This is usually a problem with limited computer memory, especially when dealing with large remote sensing images. An additional problem of previous segmentation algorithms is that often it is very difficult to pick the right segmentation parameters for the specific application. It may take days or hours to run segmentation with a particular set of parameters, only to find that an unsatisfactory result is obtained. Thus, a user was often left with a tedious and time-consuming trial-and-error process to determine the right parameters for the segmentation.

Previous work also often described segmentation algorithms with single-band or color images. There is no standardized method to segment multispectral or hyperspectral images which are widely used in remote sensing society and industry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description, given with respect to the attached drawings, may be better understood with reference to the non-limiting examples of the drawings, wherein:

FIG. 6 is an illustration showing a first order that tiles can be processed in for segmentation when the image is large;

FIG. 7 is an illustration showing a second order that tiles can be processed in for segmentation when the image is large;

DISCUSSION OF THE PREFERRED EMBODIMENTS

Figure 1:
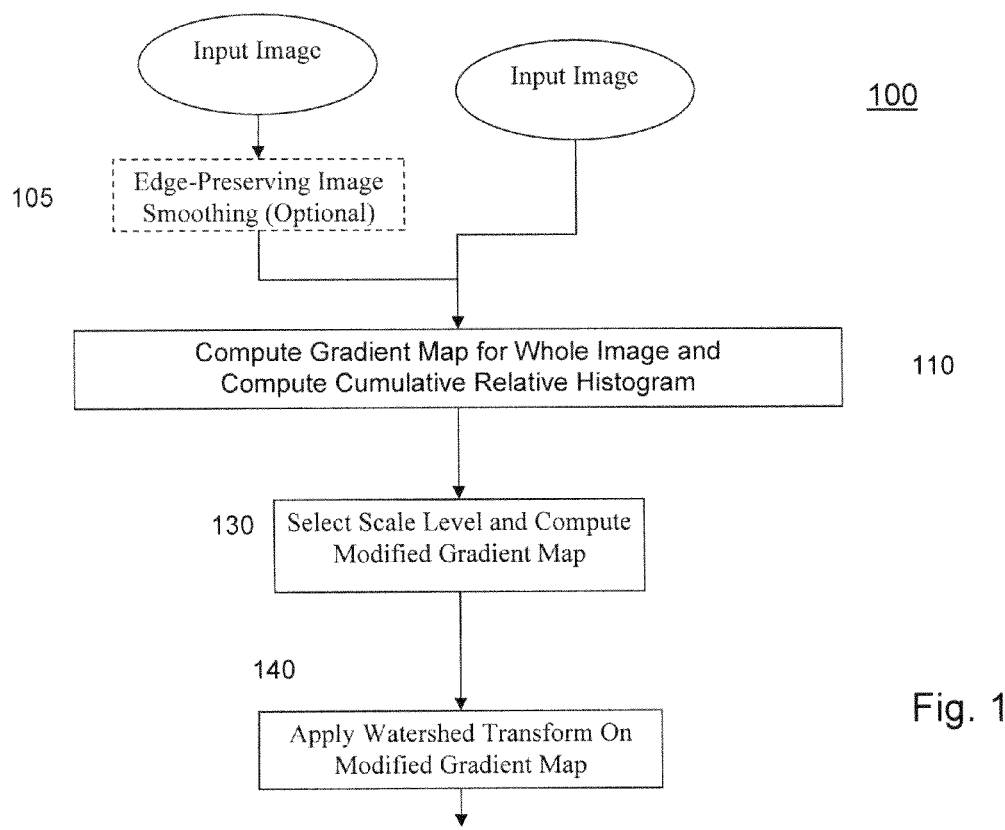
FIG. 1 is flowchart showing the general steps of an embodiment of an image processing method according to the present invention.
Figure 2A:
FIG. 2A is a composite (color) image showing buildings, roads and other features in an original image.

The general work flow of a selectable scale segmentation method 100 described herein is shown in FIG. 1. In the method, an image is received from an image source. One possible image source is a satellite with imaging capabilities. The image preferably has sections of interest that are to be automatically broken into different parts (i.e., segmented) after some initial image processing. For example, a satellite image (e.g., as shown in FIG. 2A) of an area may include buildings, roads, and other structures or vehicles. FIG. 2A is an eleven-bit, four-band QuickBird image, courtesy of DigitalGlobe, however, other image types (RGB, grayscale, etc.) can similarly be used.

As a first step in the image processing, in step 105, an image smoothing function (or filter) may be applied to the original image prior to the gradient calculations. Such a step may be performed if the user determines from a visual inspection (or an automated, computer-based analysis) that the noise or disturbance level is high in the original image, but skipped if the user elects to not spend the time performing the step. Alternatively, the system may be programmed to always perform such a filtering step before passing control to step 110. Although not illustrated, the system may even be configured to allow the user to select one of several different filters to be applied to the image and may allow one or more of such filters to be applied more than once before sending the (multiply) filtered image to step 110.

One such exemplary filter is an edge-preserving filter. Exemplary edge-preserving filters include, but are not limited to, median filters, anisotropic diffusion filters, and morphological filters based on grayscale reconstruction. In one such embodiment, a median filter with a 3*3 kernel can be applied. In one embodiment, the user may be allowed to select the size and shape of the filter to be applied (e.g., based on the characteristic to be filtered out).

In step 110, an image gradient computation converts the image data into a format that can be transformed using a watershed transform. The watershed transform is based on the existence of a complete order relation on the data being processed and is typically used on grayscale images. Since such an order relation does not exist in multi-band data space, the watershed transform is not applicable directly. Rather than trying to introduce an order relation into a multi-band data space, an analogue to the grayscale case is considered. The gradient transform to be used preferably works for both single-band and multi-band images since the segmentation method could then be applied to panchromatic, multispectral and hyperspectral images which are common in remote sensing applications.

Any of a number of edge operators (e.g., Sobel, Roberts, Canny) can be used as a gradient operator, but the amount of computation can vary measurably between the different operators. Two methods can be applied to compute the gradient for multi-band data. One method is to apply the edge operator on each band of the original image, then the responses on all bands are "fused" together to generate the overall gradient values. The other method is to apply linear or non-linear transform on the original multi-band image to obtain a new set of feature bands. Then the responses of the edge operator on a few selected new bands are computed and fused together. For generic multi-band or hyperspectral data, a linear Principle Component Analysis (PCA) is applied to get a new set of feature bands.

In an embodiment which fuses together the results of applying an edge operator to each band separately, a first possible approach is a Euclidean-based approach. Intuitively, Euclidean distance in feature space can be used to quantify the similarity between two given points. To save the computational cost, an approximation of Euclidean distance using the sum of the gradient values was applied. This fusion approach will be referred to herein as a 'SUM' fusion and is given by equation (1) below.

$$G = \sum_{i=1}^{n_b} |G_i| \quad (1)$$

A second fusion approach will be referred to herein as the 'MAX' approach and simply takes the maximum value of gradient values across all bands. This fusion strategy is close to human perception. When there is obvious spectral discontinuity in any band, the human can tell the boundary.

For multi-band or hyperspectral images, applying a PCA transform generates a new set of feature bands. Usually the first few PCA bands contain most of the variance in the data. The last PCA bands contain very little variance, and much of which is due to noise in the original data. (For some experimental data, the first 3 bands contain more than 95% of the variance in the data.)

Usually the data range and distribution are very different for different PCA bands, so in one embodiment, a normalization is performed before the gradient operation. Exemplary normalization functions are shown below in equations (2) and (3).

$$f_1' = \frac{f - \min(f)}{\max(f) - \min(f)} \quad (2)$$

$$f_2' = \frac{f - \mu_f}{\sigma_f} \quad (3)$$

According to experimental results, the normalization strategy (3) provides slightly better results than (2).

For gradient computation on images with multiple bands, the operators can be combined according to any permutations of the above techniques, such as defined by:
(1) All spectral bands then gradient 'MAX'
(2) All spectral bands then gradient 'SUM'
(3) PCA band selection then gradient 'MAX'
(4) PCA band selection then gradient 'SUM'

Figure 2B:
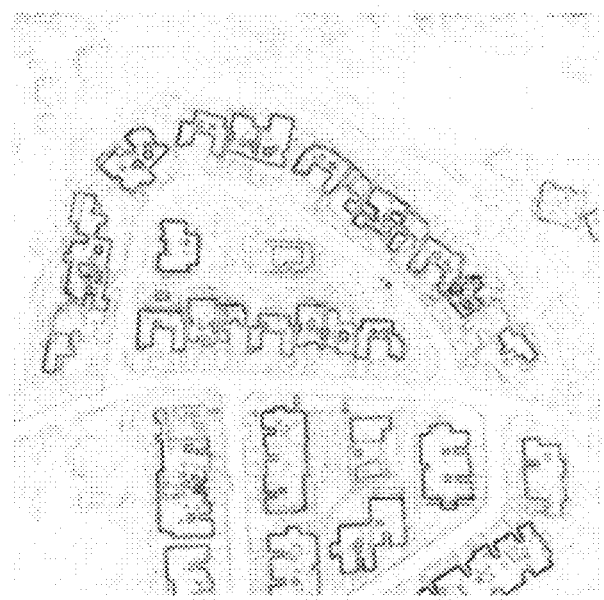
FIG. 2B is an inverted gradient map of the composite image of FIG. 2A.

Each of those four possibilities can be coupled with either, neither or both of normalization techniques (2) or (3), providing at least sixteen different possible transformation techniques. Two possible methods will be described herein. In the first method, a single-band, color, multispectral or hyperspectral image is optionally normalized (e.g., using equation (3)), then a gradient is calculated for each band of the image. The 'MAX' of the gradient values is then created to form a gradient map. In the second method, a multispectral or hyperspectral image is optionally normalized (e.g., using equation (3)), and then a number of PCA bands are selected and the gradient is calculated from those bands. The 'SUM' of the gradients bands is then calculated to form a gradient map. In one such embodiment, the bands are selected such that at least 90% of the variance data is contained within the bands that are to be applied to the 'MAX' calculation. An inverted or normal gradient map can then be viewed as a pseudo-grayscale image with an image viewing application, if desired. For better visualization, the gradient map of FIG. 2B is inverted so that darker pixels in the image have higher gradient magnitude.

Figure 3A:
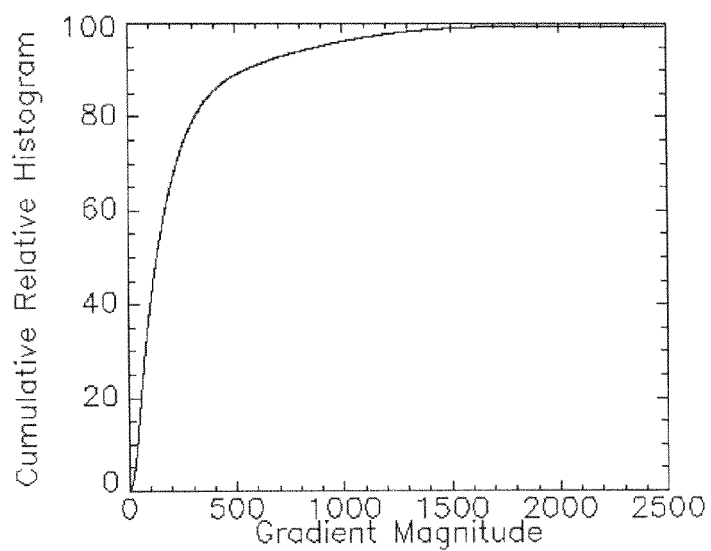
FIG. 3A is a cumulative relative histogram showing the relative numbers of pixels at or below a particular magnitude.

After having calculated the gradient map, a density function of gradients over the whole image is computed (e.g., in the form of a cumulative relative histogram, as shown in FIG. 3A). To calculate that histogram, a number of quantization levels to be used is determined. For data of byte, short integer, integer, long integer types, each integer value is used as its own quantization level. For all other data types, the number of quantization levels is set to a more manageable number of levels before further processing is performed. For example, for data such as floating point data, the gradient values are quantified into 256 (or 65536) levels such that floating point values of 0.0 to below 5.5 would be grouped into a first level of 256 (or 65536) levels, values from 5.5 to below 11.0 would be grouped into a second level of 256 (or 65536) levels, etc. Alternatively, prior to quantization, the floating point values could be scanned and maximum and minimum values could be determined. From those values, quantization ranges ($q_0$..$q_1$), ($q_1 \ldots q_2$) $\ldots$ ($_{qquant\_levels-1} \ldots q_{quant\_levels}$) can be created by calculating:

$q_0 = v_{min} + (0*(v_{max} - v_{min}))/(\text{quant levels})$ $q_1 = v_{min} + (1*(v_{max} - v_{min}))/(\text{quant levels})$ $q_2 = v_{min} + (2*(v_{max} - v_{min}))/(\text{quant levels})$ $\ldots$ $q_{quant\_levels} = v_{min} + ((\text{quant\_levels})*(v_{max} - v_{min}))/(\text{quant\_levels})$, where quant_levels is a specified value (e.g., 256 or 65536) representing the number of unique levels. Alternatively, the minimum value, $v_{min}$, may always be set to a known value (e.g., 0.0).

Figure 3B:
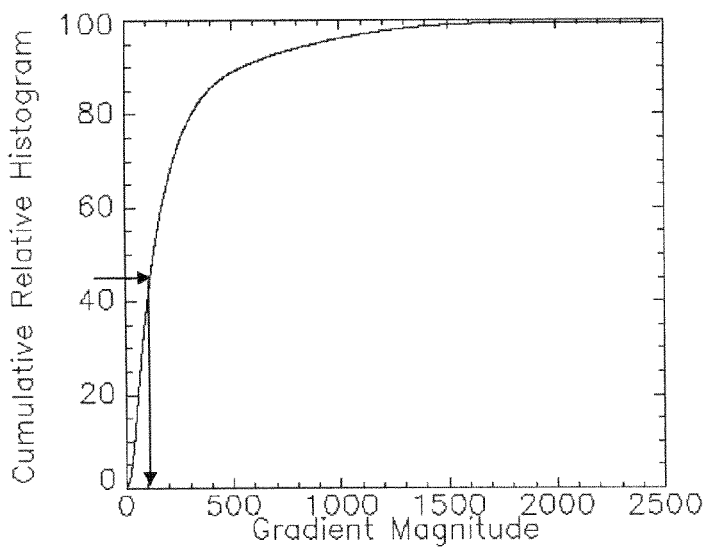
FIG. 3B is a cumulative relative histogram showing a corresponding gradient magnitude for a selected cumulative relative histogram level (scale level) of 45.
Figure 3C:
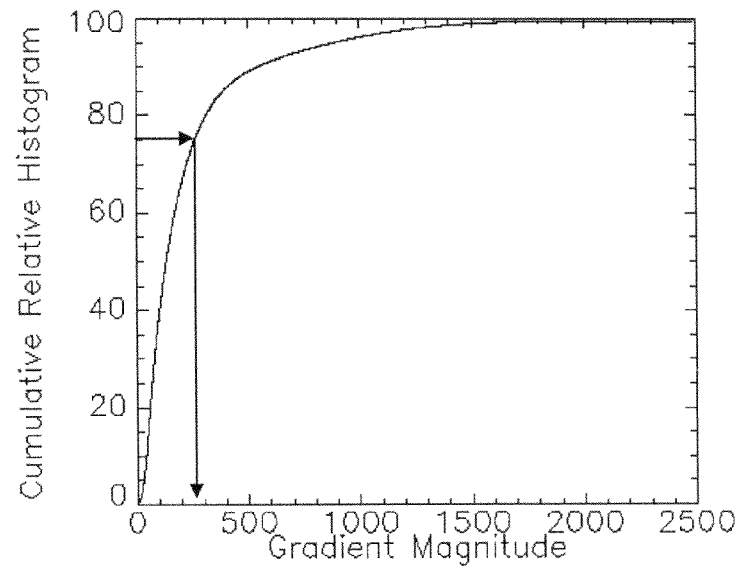
FIG. 3C is a cumulative relative histogram showing a corresponding gradient magnitude for a selected cumulative relative histogram level (scale level) of 75.
Figure 3D:
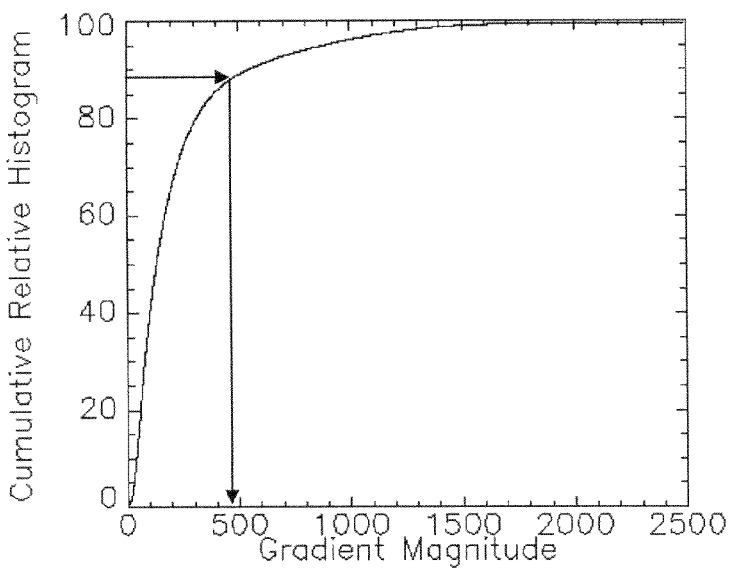
FIG. 3D is a cumulative relative histogram showing a corresponding gradient magnitude for a selected cumulative relative histogram level (scale level) of 88.

The "count" for each corresponding level is initially set to zero, and then the gradient values of the image are examined. For each corresponding pixel, the gradient value is checked and the quantization level of the gradient value for the pixel is then increased by one. For example, in a system where the gradient values are integers from 0-2500 (as shown in FIG. 3A), if the first pixel has a gradient value of 10, then the count for quantization level 10 is incremented by one. If a second pixel has a gradient value of 2499, then the count for quantization level 2499 is incremented. After all the pixels have been processed, the histogram of the gradient values is obtained. In the second step, a cumulative histogram is computed where each element, i, is the sum of the input histogram array elements 0 to i. Then the counts can be multiplied by 100 and divided by the total number of pixels in the image to produce the relative values. Thus, as shown in the exemplary histogram of FIG. 3B, 45 percent of pixels had gradient values less than or equal to about 110. As shown in FIG. 3C, 75 percent of the pixels had gradient values less than or equal to about 260. As shown in FIG. 3D, 88 percent of the pixels had gradient values less than or equal to about 475. Similarly, 100 percent of the pixels had gradient values less than or equal to 2500 because that was the maximum value. Once calculated, the cumulative relative histogram can be stored for use later, as will be described in further detail below. Such a file may have the same name as the original image file but a different extension (e.g., .crh instead of .tif for the image itself). Similarly, the original gradient map can be stored for later use, either in the same or in a different file than the cumulative relative histogram.

Once the cumulative relative histogram has been calculated, it can be used along with the gradient map to calculate the gradient scale space (step 130 of FIG. 1). By choosing a relative level threshold on the cumulative relative histogram (e.g., 45, 75 and 88 as discussed above), the corresponding gradient magnitude GT (e.g., 110, 260 and 475, respectively) can be determined. The gradient map was then modified so that the pixels with gradient magnitude less than GT were set to have the value GT. If the gradient magnitude is considered as a measure of contrast, the catchment basins associated with those low-contrast noises or disturbances will be suppressed. By changing the threshold from 0.0 to 100.0, a continuous gradient scale space can be built. The relative level threshold is called "scale level" herein. When a scale level of 0.0 is chosen, the segmentation produces over-segmentation resulting from directly applying a watershed transform on the original gradient map. When the scale level is chosen as 100.0, the segmentation produces a single region includes all pixels in the image.

The gradient scale space satisfies the scale-space monotonic property where the number of regions decreases monotonically with increasing scale. Depending on the required segmentation precision, the scale values can be a continuous variable changes from 0.0 to 100.0 or a discrete variable changes from 0 to 100. A gradient scale space is created by suppressing the weak edges to different degrees. (It is assumed that the weak edges represent intra-region noises or disturbances, while the strong edges represent the inter-region discontinuity of actual objects.)

Figure 4A:
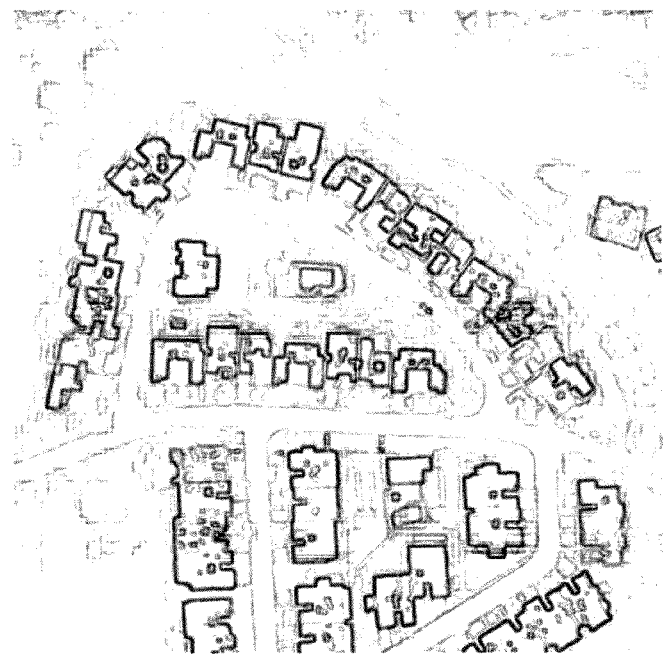
FIG. 4A is a modified, inverted gradient map using the corresponding gradient magnitude for a selected cumulative relative histogram level (scale level) of 45 of FIG. 3B as a gradient threshold.
Figure 4B:
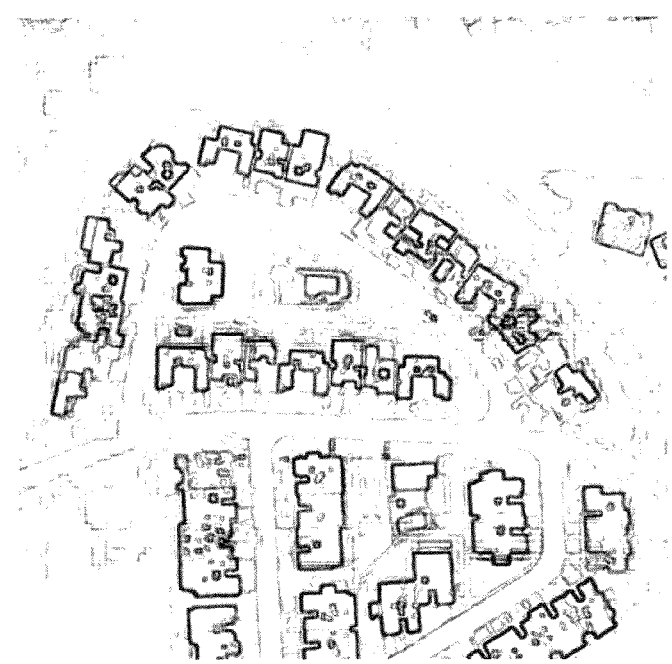
FIG. 4B is a modified, inverted gradient map using the corresponding gradient magnitude for a selected cumulative relative histogram level (scale level) of 75 of FIG. 3C as a gradient threshold.
Figure 4C:
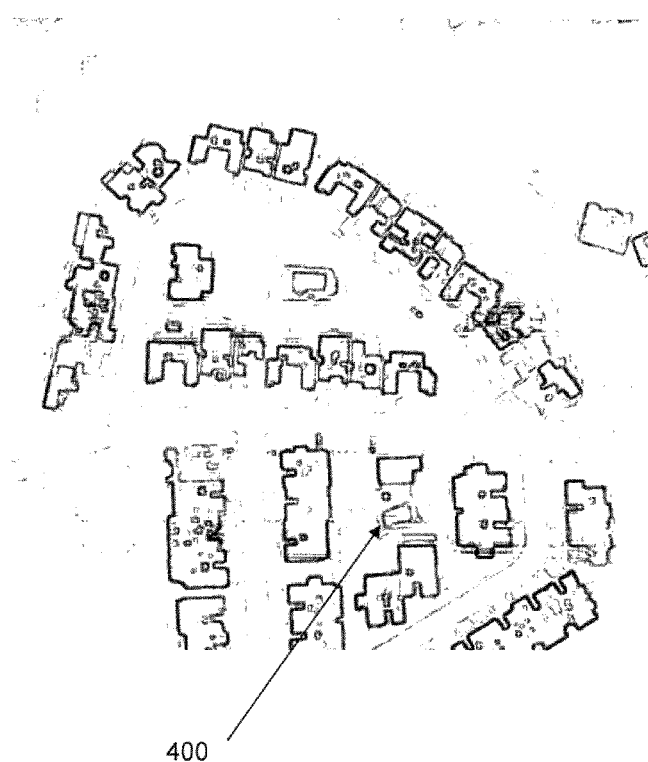
FIG. 4C is a modified, inverted gradient map using the corresponding gradient magnitude for a selected cumulative relative histogram level (scale level) of 88 of FIG. 3D as a gradient threshold.

FIGS. 4A-4C show the modified gradient maps (in inverted form) for the original (inverted) gradient map of FIG. 2B but at different scale level values (i.e., after pixels with gradient magnitude less than $G_T$ were set to have the value $G_T$). As with FIG. 2B, for better visualization, the gradient maps of FIGS. 4A-4C are inverted so that darker pixels in the image have higher gradient magnitude. For example, the gradient map (e.g., as shown in FIG. 2B in inverted form) is modified to produce the modified gradient map (e.g., as shown in FIG. 4A) by setting all gradient values less than 110 to 110. At a scale level of 45, many textures in the grass were suppressed while road boundaries remained visible. At a scale level of 75, disturbances and other features were suppressed more (as compared to a scale level of 45) while building boundaries were still visible. At a scale level of 88, spectral discontinuities in the pool 400 were suppressed. From the image, different features usually have a different contrast to surrounding background. Hence, the boundaries of different features usually were distinguishable at different scale levels. The gradient scale space built here is like a contrast scale space. The objects with high contrast persist longer in the scale space.

Using a modified gradient map with values of GT or higher (corresponding to a calculated scale level), a watershed algorithm (e.g., described by Vincent Soille) can then be applied (step 140 of FIG. 1). Preferably a watershed algorithm that runs in linear time with respect to the number of pixels processed is used.

In one exemplary embodiment, the pixels were first sorted in the increasing order of their gradient values in order to have a direct access to the pixels at a given level. Then, in a flooding step, a fast computation of geodesic influence zones is enabled by breath-first scanning of each gradient threshold level. This scanning is implemented by a FIFO queue data structure.

Figure 5A:
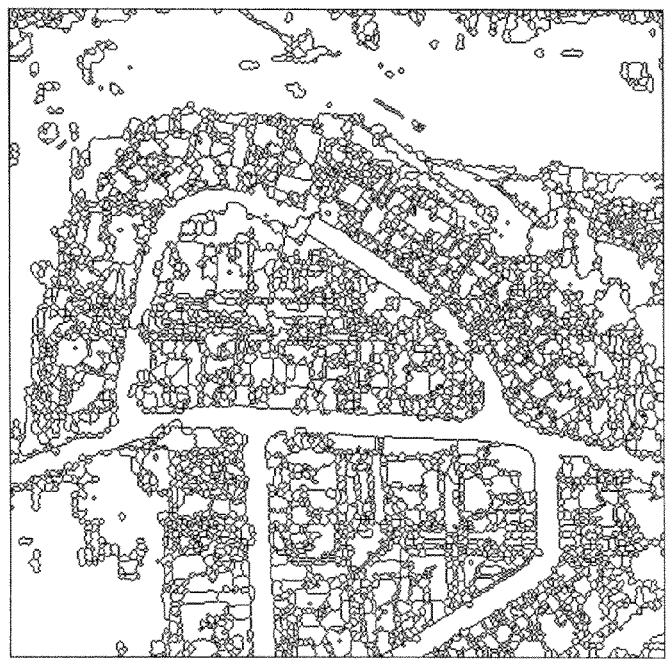
FIGS. 5A-5C are segmented images using the modified gradient maps of FIGS. 4A-4C, respectively.
Figure 5B:
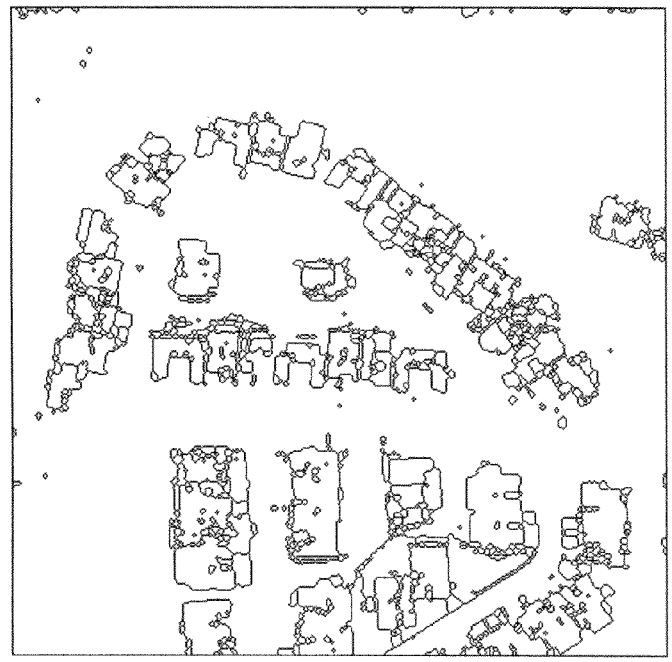
Figure 5C:
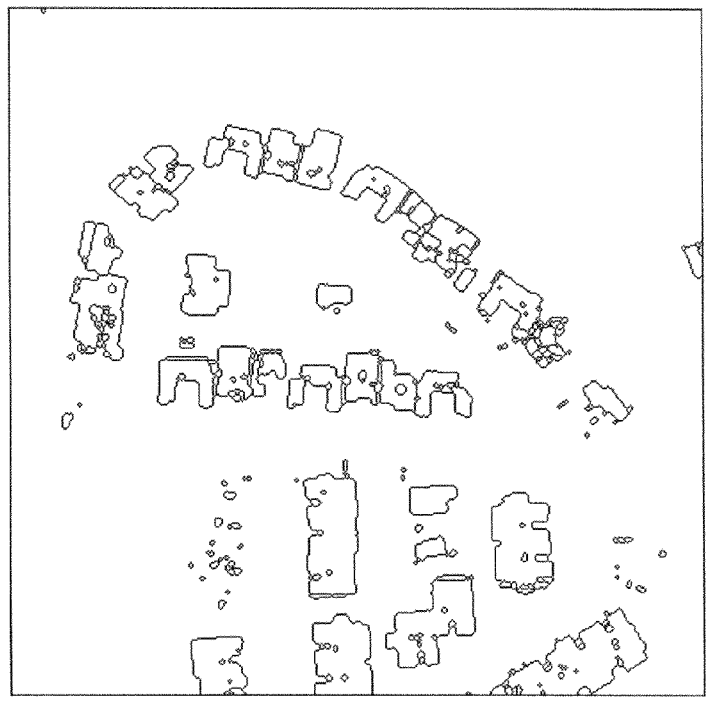

After performing the watershed transform, the pixels on the watershed lines were given label 0. The watershed lines divide the image into multiple regions. Each region was given a unique label. To obtain a tessellation of the image in its different catchment basins, the pixels on the watershed lines were merged to most similar neighboring regions. Euclidean distance of the spectrum of two pixels was used as a similarity measurement. Applying the watershed transform to different scale levels in the gradient scale space results in different segmentations. FIGS. 5A-5C show the segmentation results for the corresponding modified gradient maps of FIGS. 4A-4C, respectively, and show that different features of an image are more discernable at different scale levels. For example, a scale level of 45 provides good road delineation (FIG. 5A), a scale level of 75 provides good building delineation (FIG. 5B), and a scale level of 88 provides a good delineation for the pool (FIG. 5C).

Figures 6, 7:
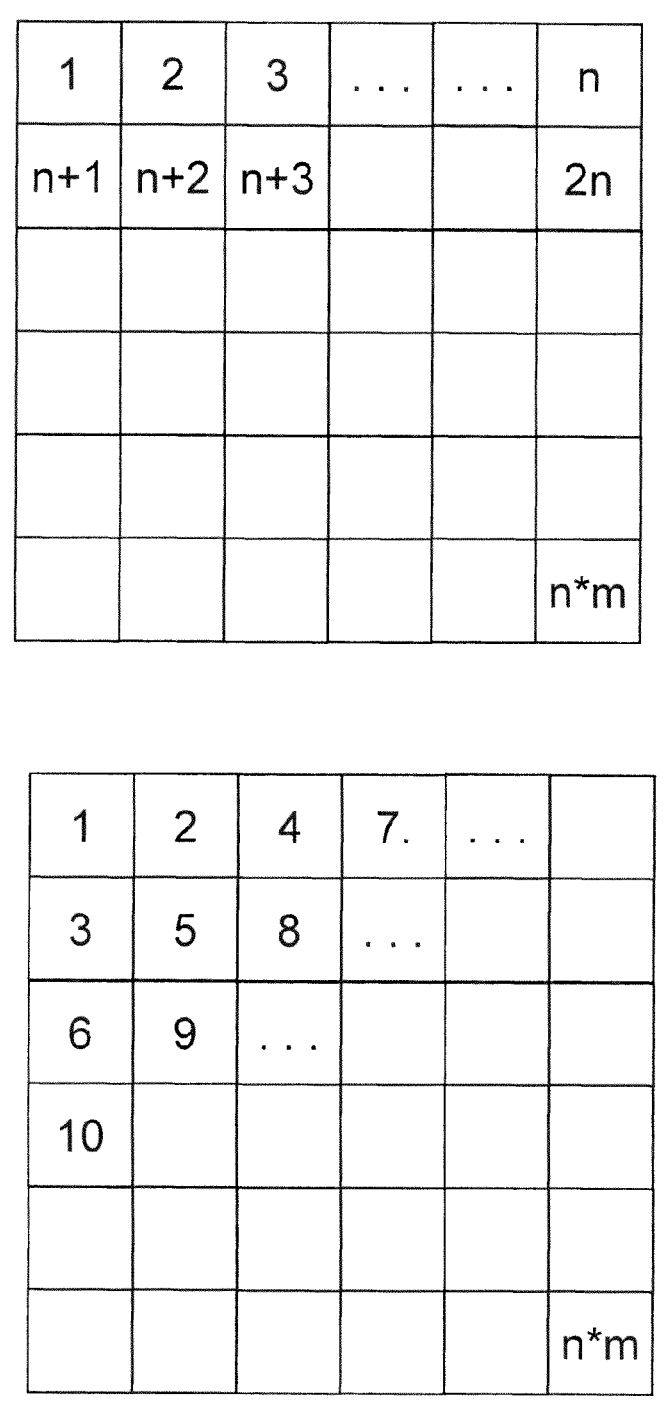

For a large image that cannot be held into computer memory at one time, a tiling scheme may be used that utilizes a modified watershed transform. At the stage of watershed transform, the large image may be split into a number of tiles. In one embodiment, the tiles are divided such that each tile has the same number of lines and samples (with the possible exception of the tiles having the last rows or columns that are "left over" after dividing the rest into equal sizes). In an alternate embodiment, the tiles may be of various sizes as long as the adjoining edges of adjacent tiles have the same sizes. Typically the number of lines equals to the number of samples, and this scheme is called "square tiling". To synchronize and communicate segmentation between tiles, the adjacent tiles were overlapped by a few lines of pixels. In one embodiment, the tiles are processed sequentially by scanning from left to right, from top to bottom, as shown in FIG. 6. In an alternate embodiment, the tiles are processed in a "wave" running diagonally, as shown in FIG. 7. At the end of the processing of one tile, the segmentation labeling results obtained over this tile and the labeling results on the right and bottom overlapping borders were kept for later adjacent tile processing. To process the next tile, first the previously computed segmentation label results on the top and left borders were read in if they exist. The watershed labeling process was applied on the tile by taking into account the existing label results on the borders and the gradient values of the remaining pixels. In this way, the watershed lines and catchment basins can run seamlessly across the borders between tiles.

In addition to performing segmentation on an entire image, it is possible to perform segmentation on a sub-image or on an image preview. Good segmentation results in objects of interest having their boundaries meet and their shape retained for later high-level image analysis. According to the system described herein, the segmentation of an image preview can be calculated to allow a user to determine if the segmentation is going to achieve the results that the user is seeking. Using the modified gradient map technique and the watershed transformation described herein, it appears that the segmentations of many sub-images are indicative of the quality of the segmentation of the image as a whole. Thus, a user can make an educated decision about whether to process a whole image using a particular scale level without having to segment the whole image.

Figure 8:
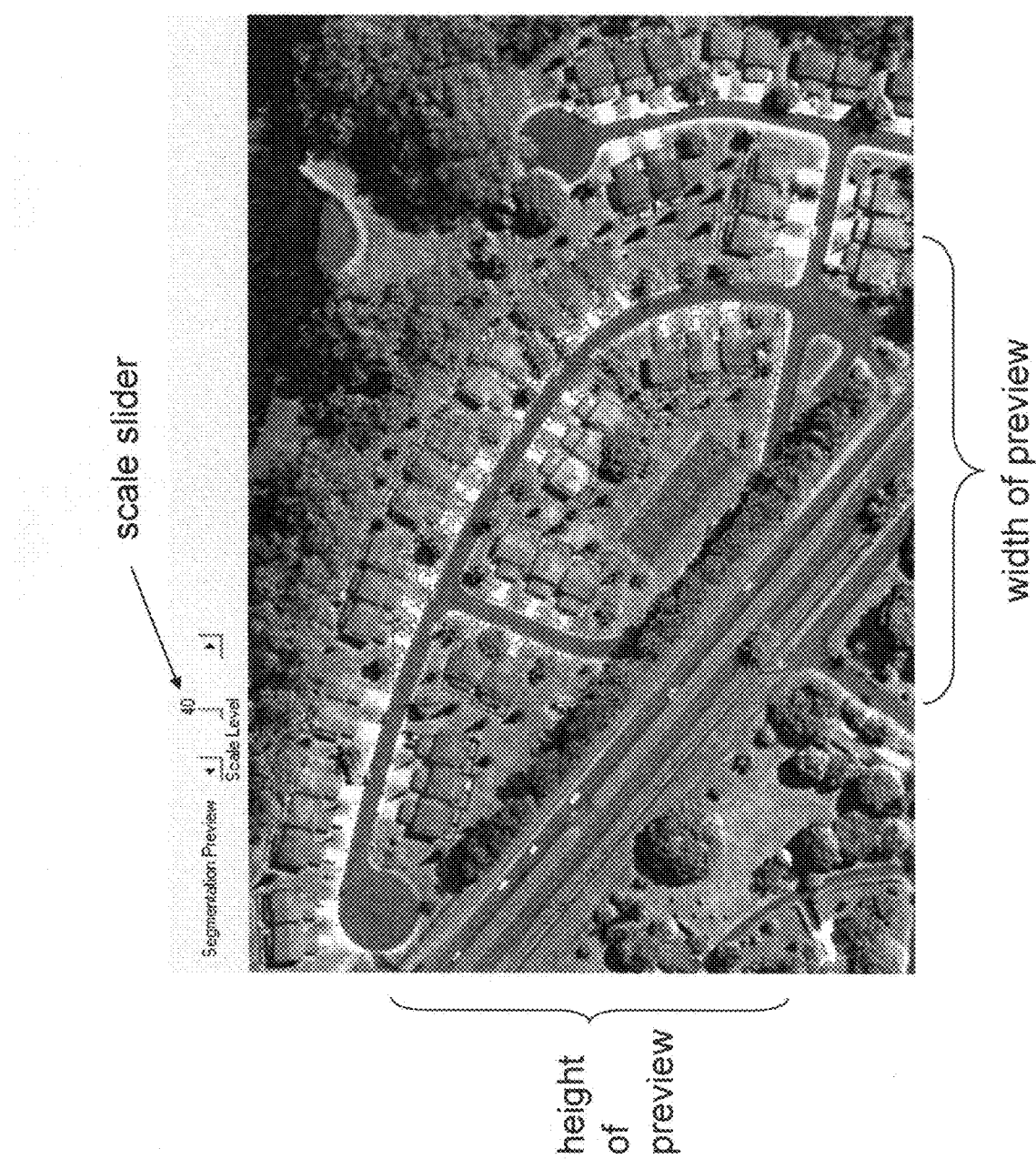
FIG. 8 is an exemplary (color) screenshot of an image preview interface for selecting a sub-image to be segmented at a selected scale level.

As shown in FIG. 8, a user can select an area of interest on the image (e.g., by drawing or moving a bounding box in or to a particular area) and then setting the desired scale level. (The original image is a QuickBird image, courtesy of Digital-Globe.) As shown, a scale level of 40 was selected and the segmentation process was performed. Preferably the bounding box is constrained such that the sub-image is small enough that the segmentation algorithm finishes relatively quickly (e.g., in less than a few seconds and preferably in less than one second). For a sub-image that is approximately 512*512 pixels, the segmentation can be finished in less than one second. This makes segmentation results updated in near real-time when adjusting parameters or selecting a new location for subset.

As demonstrated in previous description, the computational complexity of invented segmentation algorithm is O(n) which is among the fastest segmentation algorithms, while the computational complexity of a fast implementation of region merging based segmentation algorithm (Full λ-schedule) is $O(n \log_2 n)$. To test the multi-scale segmentation algorithm with a reasonable scale level value and full lambda segmentation algorithm with a reasonable number of output regions, the average computational time (in seconds) using a PC with Pentium 4 CPU at 3.20 GHz and 1 GB of RAM on test images are shown below.

|  | Preview Image Size | |
| --- | --- | --- |
|  | 512 * 512 | 1024 * 1024 |
| Multi-scale segmentation algorithm | 0.22 sec | 1.0 sec |
| Full λ-schedule algorithm | 5 sec | 16 sec |

The ability to perform a segmentation preview can avoid long processing times where a resulting image ultimately does not provide the desired or expected level of segmentation. In known systems, segmentation results are very sensitive to the plural segmentation parameters, and it is not known beforehand which of the plural values are the best for a particular image or feature type (e.g., building versus road). Known systems use a trial-and-error process where a set of plural segmentation parameters are chosen for an image and the image is segmented using that set of plural parameters. However, usually multiple segmentations using different sets of plural parameters are required to get a satisfactory result. For large image, it could take hours or days to run with a single set of segmentation parameters. For typical remote sensing data, a single image could be 2 Gbytes and the typical size is about 30000*30000 pixels.

Figure 9:
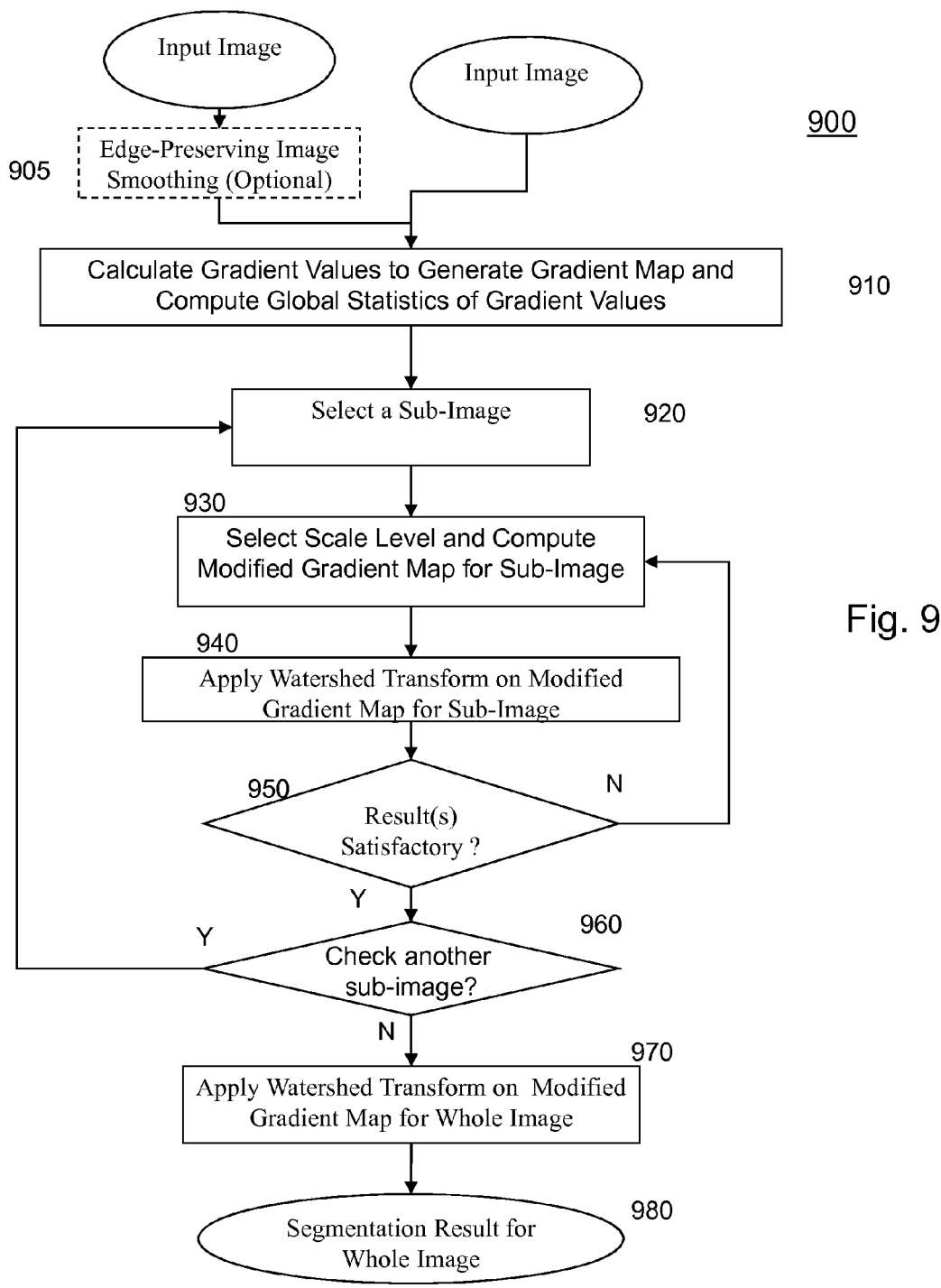
FIG. 9 is flowchart showing the general steps of an embodiment of an image processing method that uses segmentation on an image preview prior to calculation of the segmentation for the whole image.

Accordingly, as shown in the processing method 900 in FIG. 9, after an optional image smoothing step 905, it is possible to perform segmentations of partial images or sub-images so that the entire image is not processed until the results have been tested on at least one sub-image. As shown in FIG. 9, a sub-image selection step 920, can be inserted between steps 910 and 930 such that the segmentation on the selected scale level will be tested on the sub-image before the segmentation is performed on the whole image. Once the scale for the sub-image is selected in step 930, and applied to create a modified gradient map for the selected sub-image, the watershed transformation is applied in step 940. In step 950, the user determines whether the resulting segmented sub-image is acceptable. If not, control can return to step 930 where a different scale can be selected.

In an embodiment that only requires one acceptable sub-image, control would pass from step 950 to step 970 upon finding that the segmented sub-image is acceptable in step 960. However, in an embodiment where the user wants to check multiple sub-images before processing the whole image, another sub-image at the same scale level can be selected by the system, thereby returning control to step 920. In one such embodiment, the user is able to see the segmentation results of the one or more sub-images overlaid over the original image (or the filtered image) to determine whether the one or more sub-images appear to be segmented as desired. After one or more sub-images have been determined to be satisfactory, control passes to step 970 where a watershed transformation is applied to the whole image, and the segmented image can be shown to a user, e.g., as illustrated by step 980.

Alternatively, the user may wish to compare segmentation results at two different scale levels. In such a case, the user may be provided with a split screen for looking at two different segmentation results side-by-side for two different scale levels. Alternatively, the user may select a different scale using the user interface (e.g., by sliding the slider bar or entering text in the text box) so that he/she can see how a previously displayed segmentation changes to a new segmentation based on the new selected scale. For example, the user may look at the resulting segmentation to see if a known segment has been added or removed, as desired.

As described above, the cumulative relative histogram can be calculated once and then stored for later use. If a user is unhappy with a segmentation result, the user can select a different scale level to process the image (or the sub-image) at. This can be done by reading a corresponding pre-calculated cumulative relative histogram and/or gradient map. Since those calculations are independent of the scale level, they can be reused efficiently. Pre-computing a cumulative relative histogram is very important to being able to perform rapid processing of plural sub-images of a whole image. By computing the global statistics beforehand and using them in both the segmentation preview and the final segmentation on the whole image, a WYSIWYG (What You See Is What You Get) segmentation preview can be provided.

In addition to being able to tile the image for image processing purposes on a single computer, the segmentation process can likewise be distributed across multiple computers. For example, by passing to a remote computer previously computed segmentation label results on the top and left borders of the tile to be processed, as well as the modified gradient map for the tile (or the original gradient map and either (1) the gradient magnitude corresponding to the selected scale level or (2) the selected scale level and the cumulative relative histogram), the remote computer can process its segments independently and return the segments and labels to the original computer. This processing can be performed in a "wave" staring in the upper left-hand corner of the image and spreading down diagonally toward the bottom right-hand corner. This same distribution technique can be used to remotely generate one or more segmentation previews.

Each of the techniques described herein can be stored in a computer readable medium having embedded therein computer code for controlling a microprocessor or other processor (e.g., a digital signal processor) to perform the steps of the techniques.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer-implemented method of processing a digital image at a selected scale level, the method comprising:
   calculating a gradient map for a portion of the digital image greater than a size of a first preview area and including the first preview area;
   calculating a cumulative relative histogram for the gradient map for the portion of the digital image greater than the size of the first preview area and including the first preview area;
   selecting a location of the first preview area within the portion of the digital image greater than the size of the first preview area and including the first preview area;
   receiving a selected scale level to be used for an initial segmentation of the first preview area;
   (a) calculating a modified gradient map for the first preview area using the gradient map, the cumulative relative histogram and the selected scale level by determining from the cumulative relative histogram a threshold gradient value corresponding to the selected scale level and setting gradient values in the gradient map that are below the threshold gradient value to a minimum threshold;
   (b) segmenting the modified gradient map for the first preview area to create a first segmented preview image;
   (c) displaying the first segmented preview image;
   (d) receiving an indication of whether the first segmented preview image is acceptable;
   (e) receiving a new selected scale level and repeating steps (a)-(d) using the new selected scale level as the selected scale level until the indication received in step (d) indicates that the first segmented preview image is acceptable; and
   (f) segmenting the portion of the digital image greater than the size of the first preview area and including the first preview area using the selected scale level used when the indication in step (d) indicates that the first segmented preview image is acceptable.

2. The method as claimed in claim 1, wherein segmenting the modified gradient map for the first preview area comprises performing a watershed transformation.

3. The method as claimed in claim 1, wherein the minimum threshold is the threshold gradient value.

4. The method as claimed in claim 1, wherein calculating a gradient map for the portion of the digital image greater than the size of the first preview area and including the first preview area comprises combining gradient data from multiple bands of multi-band data.

5. The method as claimed in claim 4, wherein combining gradient data from multiple bands of multi-band data comprises combining the gradient values of multiple bands using a SUM function.

6. The method as claimed in claim 4, wherein combining gradient data from multiple bands of multi-band data comprises combining the gradient values of multiple bands using a MAX function.

7. The method as claimed in claim 1, wherein calculating a gradient map for the portion of the digital image greater than the size of the first preview area and including the first preview area comprises applying a linear or a non-linear transform to multiple bands of multi-band data, selecting plural bands of the transformed bands and combining the gradient data on the selected plural bands.

8. The method as claimed in claim 7, wherein the linear transform comprises Principal Component Analysis.

9. The method as claimed in claim 7, wherein the selected plural bands are selected such that at least 90% to 95% of variance data is contained within the selected plural bands that are to be applied to further gradient computation.

10. The method as claimed in claim 1, wherein calculating a gradient map for the portion of the digital image greater than the size of the first preview area and including the first preview area comprises normalizing data from multiple bands of multi-band data before gradient computation and combining the normalized gradient data.

11. The method as claimed in claim 1, wherein calculating a gradient map for the portion of the digital image greater than the size of the first preview area and including the first preview area comprises filtering the digital image before calculating the gradient map.

12. The method as claimed in claim 11, wherein the filtering comprises filtering using an edge-preserving filter.

13. The method as claimed in claim 1, wherein the portion of the digital image used to calculate the gradient map and the cumulative relative histogram is greater than a size of the first preview area and a second preview area and including the first and second preview areas, and wherein the step (f) of segmenting further comprises:
   (g) calculating a modified gradient map for the second preview area using the gradient map, the cumulative relative histogram and the selected scale level by setting gradient values in the gradient map that are below the threshold gradient value to the minimum threshold;
   (h) segmenting the modified gradient map for the second preview area to create a second segmented preview image;
   (i) displaying the second segmented preview image;
   (j) receiving an indication of whether the second segmented preview image is acceptable;
   (k) receiving a new selected scale level and repeating steps (a)-(j) using the new selected scale level as the selected scale level until the indications received in steps (d) and (j) indicate that the first and second segmented preview images are acceptable; and
   (l) segmenting the portion of the digital image greater than the size of the first and second preview areas and including the first and second preview areas using the selected scale level used when the indications in steps (d) and (j) indicate that the first and second segmented preview images are acceptable.

14. The method as claimed in claim 1, wherein the portion of the digital image greater than the size of the first preview area and including the first preview area comprises the whole digital image.

15. A computer-implemented method of processing a digital image at a selected scale level comprising:
   calculating a gradient map for the digital image;
   calculating a density function for the gradient map;
   calculating a modified gradient map using the gradient map, the density function and the selected scale level; and
   segmenting the modified gradient map, wherein segmenting the modified gradient map comprises:
   selecting a first sub-portion of the modified gradient map;
   segmenting the first sub-portion of the modified gradient map;
   selecting a second sub-portion of the modified gradient map different from the first sub-portion; and
   segmenting the second sub-portion of the modified gradient map using the selected scale level used to segment the first sub-portion of the modified gradient map.

16. The method as claimed in claim 15, wherein segmenting the modified gradient map for the first and second sub-portions comprises performing watershed transformations on the first and second sub-portions.

17. A computer system for processing a digital image at a selected scale level, the system comprising:
a processor; and
a memory, wherein the memory comprises computer code stored therein for causing the processor to perform the steps of:
calculating a gradient map for a portion of the digital image greater than a size of a first preview area and including the first preview area;
calculating a cumulative relative histogram for the gradient map for the portion of the digital image greater than the size of the first preview area and including the first preview area;
selecting a location of the first preview area within the portion of the digital image greater than the size of the first preview area and including the first preview area;
receiving a selected scale level to be used for an initial segmentation of the first preview area;
(a) calculating a modified gradient map for the first preview area using the gradient map, the cumulative relative histogram and the selected scale level by determining from the cumulative relative histogram a threshold gradient value corresponding to the selected scale level and setting gradient values in the gradient map that are below the threshold gradient value to a minimum threshold;
(b) segmenting the modified gradient map for the first preview area to create a first segmented preview image;
(c) displaying the first segmented preview image;
(d) receiving an indication of whether the first segmented preview image is acceptable;
(e) receiving a new selected scale level and repeating steps (a)-(d) using the new selected scale level as the selected scale level until the indication received in step (d) indicates that the first segmented preview image is acceptable; and
(f) segmenting the portion of the digital image greater than the size of the first preview area and including the first preview area using the selected scale level used when the indication in step (d) indicates that the first segmented preview image is acceptable.

18. The computer system as claimed in claim 17, wherein segmenting the modified gradient map for the first preview area comprises performing a watershed transformation.

19. The computer system as claimed in claim 17, wherein the portion of the digital image used to calculate the gradient map and the cumulative relative histogram is greater than a size of the first preview area and a second preview area and including the first and second preview areas, and wherein the step (f) of segmenting further comprises:
(g) calculating a modified gradient map for the second preview area using the gradient map, the cumulative relative histogram and the selected scale level by setting gradient values in the gradient map that are below the threshold gradient value to the minimum threshold;
(h) segmenting the modified gradient map for the second preview area to create a second segmented preview image;
(i) displaying the second segmented preview image;
(j) receiving an indication of whether the second segmented preview image is acceptable;
(k) receiving a new selected scale level and repeating steps (a)-(j) using the new selected scale level as the selected scale level until the indications received in steps (d) and (j) indicate that the first and second segmented preview images are acceptable; and
(l) segmenting the portion of the digital image greater than the size of the first and second preview areas and including the first and second preview areas using the selected scale level used when the indications in steps (d) and (j) indicate that the first and second segmented preview images are acceptable.

20. The computer system as claimed in claim 17, wherein the portion of the digital image greater than the size of the first preview area and including the first preview area comprises the whole digital image.

21. The computer system as claimed in claim 17, wherein calculating a gradient map for the portion of the digital image greater than the size of the first preview area and including the first preview area comprises combining gradient data from multiple bands of multi-band data.

22. A computer program product comprising:
a computer readable non-transitory medium; and
computer code embedded in the computer readable non-transitory medium for causing a processor reading the computer code embedded in the computer readable non-transitory medium to perform the steps of:
calculating a gradient map for a portion of a digital image greater than a size of a first preview area and including the first preview area;
calculating a cumulative relative histogram for the gradient map for the portion of the digital image greater than the size of the first preview area and including the first preview area;
selecting a location of the first preview area within the portion of the digital image greater than the size of the first preview area and including the first preview area;
receiving a selected scale level to be used for an initial segmentation of the first preview area;
(a) calculating a modified gradient map for the first preview area using the gradient map, the cumulative relative histogram and the selected scale level by determining from the cumulative relative histogram a threshold gradient value corresponding to the selected scale level and setting gradient values in the gradient map that are below the threshold gradient value to a minimum threshold;
(b) segmenting the modified gradient map for the first preview area to create a first segmented preview image;
(c) displaying the first segmented preview image;
(d) receiving an indication of whether the first segmented preview image is acceptable;
(e) receiving a new selected scale level and repeating steps (a)-(d) using the new selected scale level as the selected scale level until the indication received in step (d) indicates that the first segmented preview image is acceptable; and
(f) segmenting the portion of the digital image greater than the size of the first preview area and including the first preview area using the selected scale level used when the indication in step (d) indicates that the first segmented preview image is acceptable.

23. The computer program product as claimed in claim 22, wherein
segmenting the modified gradient map for the first preview area comprises performing a watershed transformation.

24. The computer program product as claimed in claim 22, wherein the portion of the digital image greater than the size of the first preview area and including the first preview area comprises the whole digital image.

25. The computer program product as claimed in claim 22, wherein the portion of the digital image used to calculate the gradient map and the cumulative relative histogram is greater than a size of the first preview area and a second preview area and including the first and second preview areas, and wherein the step (f) of segmenting further comprises:

(g) calculating a modified gradient map for the second preview area using the gradient map, the cumulative relative histogram and the selected scale level by setting gradient values in the gradient map that are below the threshold gradient value to the minimum threshold;

(h) segmenting the modified gradient map for the second preview area to create a second segmented preview image;

(i) displaying the second segmented preview image;

(j) receiving an indication of whether the second segmented preview image is acceptable;

(k) receiving a new selected scale level and repeating steps (a)-(j) using the new selected scale level as the selected scale level until the indications received in steps (d) and (j) indicate that the first and second segmented preview images are acceptable; and (l) segmenting the portion of the digital image greater than the size of the first and second preview areas and including the first and second preview areas using the selected scale level used when the indications in steps (d) and (j) indicate that the first and second segmented preview images are acceptable.

26. The computer program product as claimed in claim 22, wherein calculating a gradient map for the portion of the digital image greater than the size of the first preview area and including the first preview area comprises combining gradient data from multiple bands of multi-band data.

* * * * *